United States Patent

[11] 3,612,252

| [72] | Inventor | Aiting T. Yu |
| | | Kinneton, N.J. |
| [21] | Appl. No. | 1,703 |
| [22] | Filed | Jan. 9, 1970 |
| [45] | Patented | Oct. 12, 1971 |
| [73] | Assignee | Hewitt-Robins Incorporated |

[54] CABLE TRAINED SEAL BELT
3 Claims, 7 Drawing Figs.

[52] U.S. Cl. ..................................... 198/103, 198/165, 198/167, 198/203
[51] Int. Cl. ..................................... B65g 37/00, B65g 15/14
[50] Field of Search ........................... 198/184, 204, 201, 203, 165, 167, 193, 103

[56] References Cited
UNITED STATES PATENTS

| 2,978,095 | 4/1961 | Jenike | 198/165 |
| 2,796,970 | 6/1957 | Borrowdale | 198/167 |
| 3,069,786 | 12/1962 | Nichols | 198/204 |

FOREIGN PATENTS

| 810,651 | 3/1959 | Great Britain | 198/184 |
| 774,971 | 5/1957 | Great Britain | 198/201 |

*Primary Examiner*—Richard E. Aegerter
*Attorneys*—John D. Boos and John D. Lister ABSTRACT: A rotatably mounted wheel, having a plurality of radially extending, open-ended peripheral storage cells therein for elevating material, employs a cable trained seal belt assembly which engages the inner annular surface of the wheel to seal the inner ends of the cells and maintain material within the storage cells during elevation. A conveyor belt, which transfers material to the storage cell, is wrapped part way about the outer peripheral surface of the wheel, driving the wheel which, in turn, drives the cable trained seal belt so that the linear speeds of cooperating wheel and belt sealing surfaces are the same or substantially the same. The cables of the seal belt assembly, which are located adjacent the lateral edges of the belt, maintain the seal belt in proper alignment with the wheel and the lateral edge portion of the seal belt in tight sealing contact with the inner sealing surfaces of the wheel for the entire length of the seal belt run.

INVENTOR
Hiting T. Yu
BY
John D Lister
ATTORNEY.

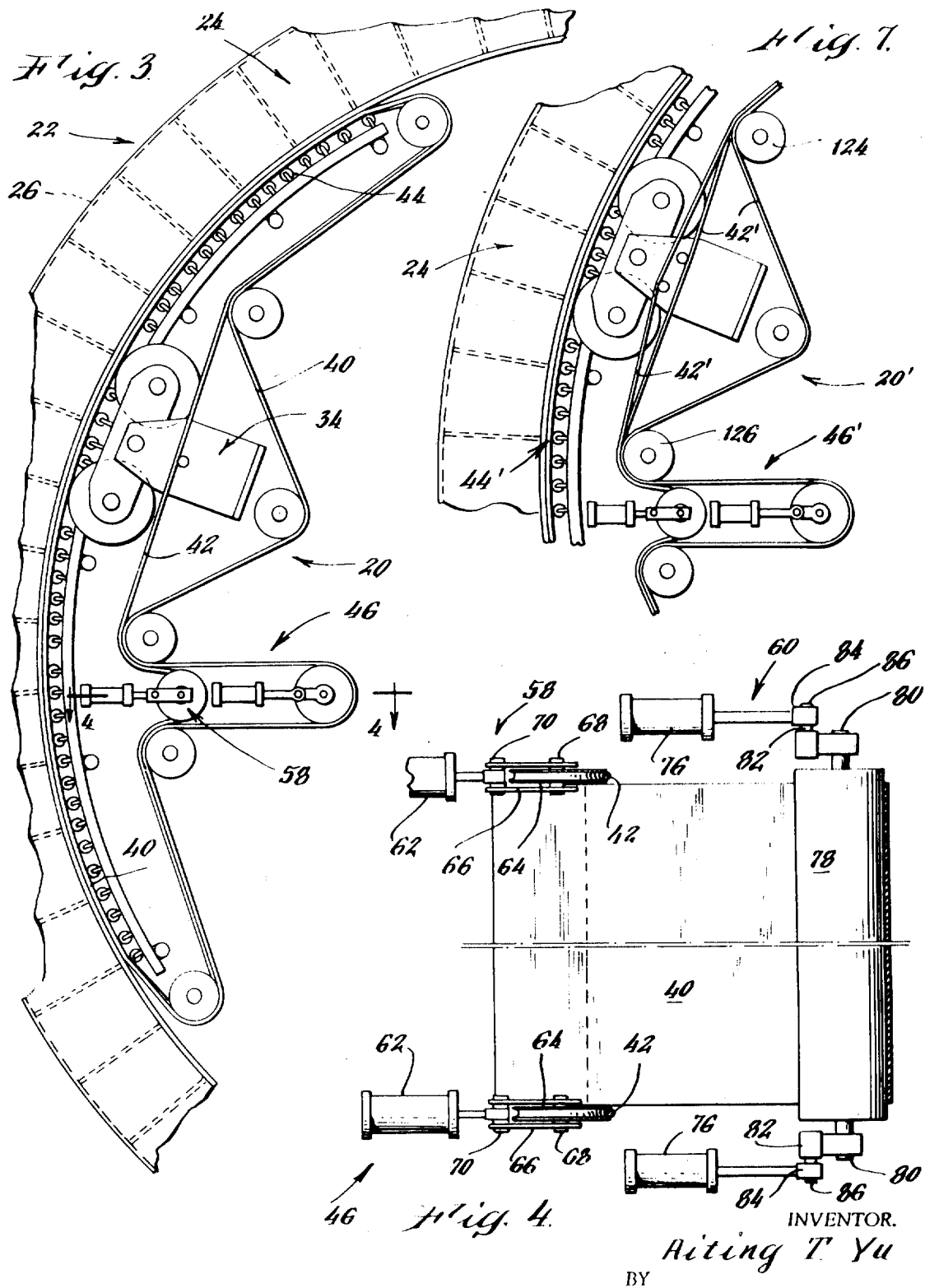

INVENTOR.
Aiting T. Yu

BY

John D Lister
ATTORNEY.

3,612,252

CABLE TRAINED SEAL BELT

BACKGROUND OF THE INVENTION

In rotary elevators of the type disclosed in U.S. Pat. No. 3,470,999, issued Oct. 7, 1969, to F. O. Snow, III, there is a need to insure that the inner ends of the radially extending storage cells are properly sealed to prevent the loss of material from the cells until the storage cells are over the discharge chute of the upper conveyor. This is particularly true when the elevator wheel is being utilized within the hold of a ship or in other confined areas where spillage can not be tolerated due to the limited amount of space beneath and about the wheel and the difficulty encountered in removing the material from such a confined area.

Attempts have been made in the past to seal the inner ends of rotary elevator storage cells by means of endless belts, as evidenced by the patent to R. W. Eichenberger, U.S. Pat. No. 1,776,420, issued Sept. 23, 1930. However, such proposals have failed to disclose appropriate guide or training means for insuring proper alignment between the belt and storage cells. Furthermore, they have failed to encompass or suggest the use of cable trained seal belt assemblies, as in the present invention, or similar assemblies which improve the general sealing characteristics along the lateral edge portions of the belt where contact is made between the belt and the lateral sealing surfaces of the elevator wheel storage cells.

BRIEF DESCRIPTION OF THE INVENTION

The present invention overcomes many of the disadvantages of the prior art by providing rotary elevator and belt conveyor assemblies with a cable trained seal belt assembly to maintain material within storage cells of the rotary elevator as the material is being elevated from the level of the input conveyor belt to the level of the output conveyor belt. The rotatably mounted wheel of the elevator, which can be 60 feet in diameter, has a plurality of radially extending storage cells which are normally open at their inner ends. Once the material to be elevated has been transferred to the storage cells, the loss of material from the inner ends of the cells must be prevented during elevation of the material until the storage cells are over the discharge chute or output conveyor belt.

To prevent the loss of material from the storage cells during elevation, the present invention utilizes a cable trained seal belt assembly wherein longitudinally extending cables adjacent the lateral edges of the seal belt cooperate with ribs or grooves of the belt to guide the belt during the sealing run. With this construction the sealing belt, which can be 10 feet in width, is maintained in proper alignment with the elevator wheel, even though the width of the belt may vary. The midportion of the belt is urged outwardly into contact with the inner ends of the walls separating the storage cells by idler rolls to minimize or eliminate seepage of material between cells and the lateral edge portions of the belt are urged into contact with the inner ends of the storage cell sidewalls, to minimize or eliminate the seepage of material from the storage cells, by the training cables which, in turn, are urged outwardly by cable sheave assemblies. The tensioned training cables augment the sealing characteristics of the system by maintaining the lateral edges of the belt in tight sealing contact with the inner surface of the wheel both at and intermediate successive idler roll and cable sheave assemblies, and by forcing the belt against the inner surface of the wheel with a force sufficient to cause the belt and training cables to be driven by the wheel at the same or substantially the same linear speed as that of the inner peripheral surface of the wheel. The present invention also utilizes separate cable takeup and belt takeup assemblies so that the tensions in the sealing belt and the training cables can be independently regulated and adjusted to suit the specific operating conditions of the rotary elevator assembly, thereby providing an effective, long-lasting sealing assembly which can be adapted to varying conditions even after it has been placed in service.

From the above it can be seen that a principal object of the present invention is to provide a sealing belt assembly for rotary elevators which insures proper training of the belt, even though the belt is not uniform in width, and which maintains the sealing belt in proper alignment with the sealing surfaces of the rotary elevator wheel.

A further object of the invention is to provide a seal belt assembly wherein the longitudinal edge portions of the sealing belt are maintained in contact with the inner surface of the elevator wheel not only at the idler roll and cable sheave assemblies but also intermediate successive assemblies and wherein the sealing belt is urged against the inner surface of the wheel by the idlers and training cables with sufficient force to cause the seal belt assembly to be driven by the elevator wheel.

A still further object of the invention is to provide a cable trained seal belt assembly wherein the tensions in the training cables and the sealing belt can be regulated independently of one another.

An even further object of the invention is to provide a cable trained seal belt assembly wherein the seepage of material both from the elevator wheel and intermediate successive storage cells of the elevator wheel is eliminated or minimized.

An even further object of the invention is to provide a seal belt assembly which is durable and relatively maintenance free to prevent excessive down time and minimize maintenance costs.

The above objects and advantages will become more apparent and other objects and advantages will become apparent from the following detailed description when taken in conjunction with the accompanying drawings in which:

FIG. 3 is an enlarged fragmentary view of the rotary elevator of FIG. 1 to better illustrate the cable trained seal belt assembly;

FIG. 4 is a view taken substantially along lines 4—4 of FIG. 3 to illustrate the cable and belt takeup assemblies;

Figure 6:
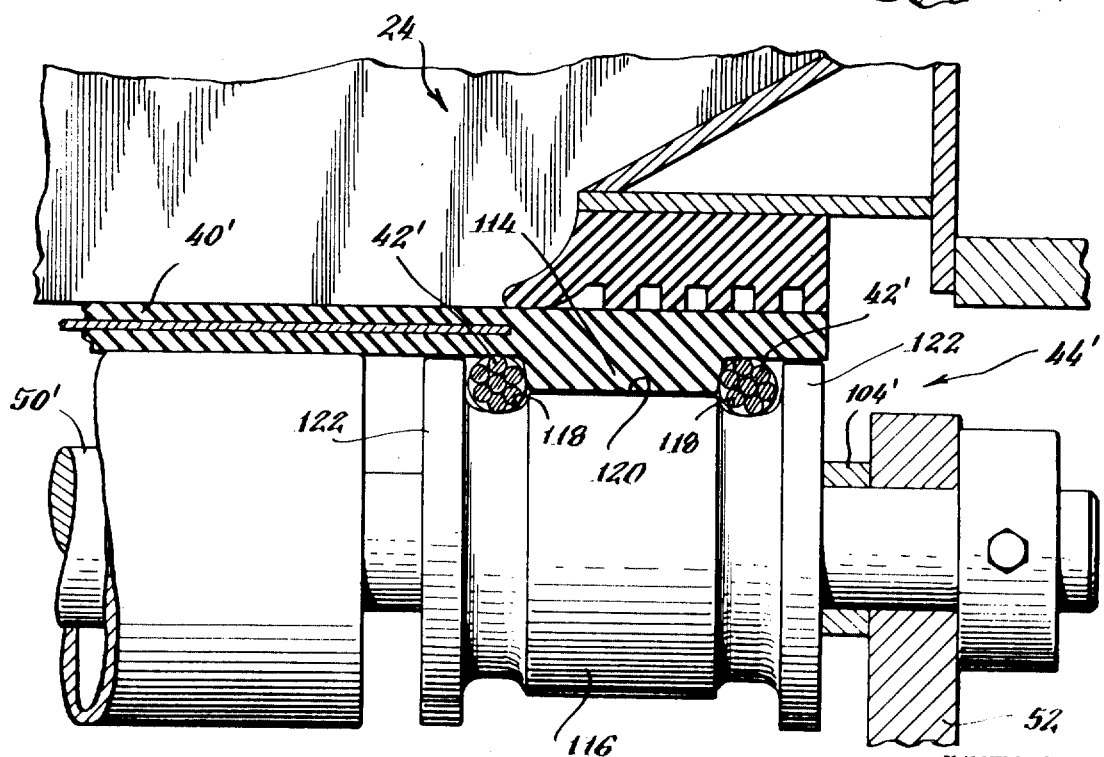

FIG. 6 is an enlarged cross-sectional view taken through a typical idler roll and cable sheave, of a modified form of the cable trained seal belt of the present invention utilizing twin parallel cable runs adjacent each lateral edge of the sealing belt; and FIG. 7 is a fragmentary view of a seal belt assembly according to FIG. 6 illustrating a cable crossover so that only one continuous cable is needed for each lateral edge.

DETAILED DESCRIPTION OF THE INVENTION

Figures 1, 2:
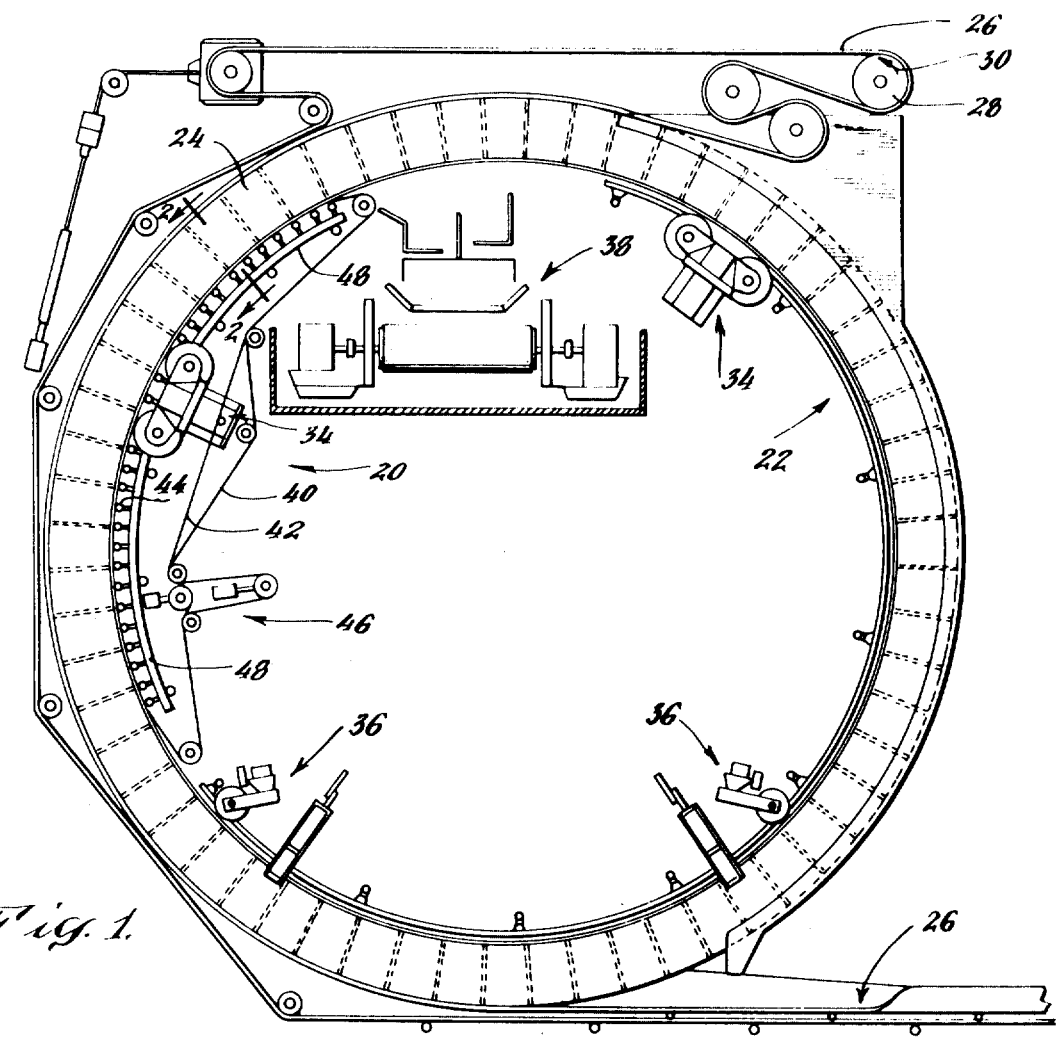
FIG. 1 is a side elevational view of a rotary elevator utilizing a preferred form of the cable trained seal belt assembly of the present invention.
FIG. 2 is a transverse cross-sectional view taken substantially along lines 2—2 of FIG. 1.

Referring now to the drawings and in particular to FIG. 1 of the drawings, a preferred form of the cable trained seal belt assembly 20 is illustrated sealing a portion of the inner annular surface of a rotary elevator wheel 22. The rotary elevator wheel with the exception of the provision for sealing the interior ends of the storage cells is similar or identical to the rotary elevator wheel set forth in the previously cited U.S. Pat. No. 3,470,999, issued Oct. 7, 1969.

The wheel 22 is provided with a plurality of radially extending storage cells 24 located around the periphery of the wheel which are open at their radially outermost and innermost ends. A first conveyor belt 26 provides the material input to the rotary elevator with the belt being wrapped substantially halfway around the outer periphery of the wheel 22. With this construction the belt 26 not only transfers material to the elevator wheel 22 as the belt and the wheel cooperate to elevate the material but, in addition, the belt 26 functions to seal the outermost ends of the storage cells and provide a frictional drive for rotating the elevator wheel 22 about its horizontal axis of rotation. As illustrated in FIG. 1, the belt 26 is driven by a powered head pulley 28 in the direction indicated by arrow 30, thereby imparting a clockwise rotation to the rotary elevator wheel 22.

While the seal belt assembly 20 of the present invention is illustrated in combination with rotary elevator 22, it is to be understood that the cable trained seal belt assembly 20 of the present invention can be utilized to seal the innermost openings of storage cells provided in other forms of rotary elevators. In addition, it is to be understood that the cable trained seal belt assembly can be applied to other types of material transfer assemblies wherein adequate sealing is required by the peripheral edges of the sealing belt.

As illustrated, the rotary elevator is carried on and held in proper alignment by pairs of equalizer bogies 34, 36 which cooperate with annular guide rails on the inner peripheral surface of the wheel 22. The material is transferred from the conveyor belt 26 to the storage cells 24 and from the storage cells 24 to conveyor 38 which conveys the material away from the elevator at the desired elevation. The bogies 34, 36, the conveyor assembly 38, as well as conveyor belt 26 and its drive assembly 28 can be supported in a conventional manner on support assemblies not shown.

Turning now to one preferred form of invention which is illustrated in FIGS. 1 through 5 of the drawings, the cable trained seal belt assembly 20 comprises a belt 40, cables 42, idler roll and cable sheave assemblies 44, and cable and belt takeup assembly 46. In the modified form of the invention illustrated in FIGS. 6 and 7, the cable seal belt assembly 20', comprises a belt 40', cables 42', idler roll and cable sheave assemblies 44', and cable and belt takeup assemblies 46'. The primed reference numerals in FIGS. 6 and 7 refer to components of the modified embodiment which correspond to the embodiment illustrated in FIGS. 1 through 5.

As best shown in FIGS. 1 to 3, the idler roll and cable sheave assemblies 44 are mounted on arcuately extending frame members 48 which, in turn, are supported in a conventional manner on support structure, not shown. The ends of shafts 50, which carry the idler rolls and cable sheaves, are mounted within brackets 52 that are slidably retained on guides 54 provided along the sides of support members 48. The guides 54 are slidably received within radially extending slots of the brackets 52 with planar surfaces of guides 54 cooperating with the radially extending planar sides of the slots in the brackets to maintain the brackets in proper radial alignment. The brackets 52 and consequently the idler roll and cable sheave assemblies 44 are urged radially outward by the leaf spring assemblies. The leaf spring assemblies are interconnected to the inner ends of brackets 52 by adjusting screw and locknut assemblies 55 which are threadably received within the ends of brackets 52 with the heads engaging the outer ends of leaf spring assemblies 56. As shown, the leaf spring assemblies 56 have central mountings and are affixed to the inner sides of the arcuate support members 48. With this or other equivalent constructions, the idler roll and sheave assemblies 44 of the present invention are urged radially outward toward the inner annular surface of the elevator wheel 22.

The cable trained seal assembly 20 is also provided with a cable and belt takeup assembly 46. This assembly comprises independent takeup assemblies 58, 60 for the cable and belt, respectively, which are best shown in FIGS. 3 and 4.

As illustrated, the cable takeup assembly 58 is made up of a pair of pneumatic or hydraulic piston and cylinder assemblies 62 and cable carrying sheaves 64. The sheaves 64 are secured to the piston and cylinder assemblies by links 66 which extend between and are affixed to the sheave axles 68 and the pins 70 which pass through the terminal portions of the piston rods. The forces exerted on the sheaves 64 by the piston and cylinder assemblies 62 are regulated to equalize the tensions in cables 42 which extend along either side of belt 40. For example, the assemblies 62 can be interconnected by a conventional force equalization bar having equal moment arms or both assemblies 62 can be identical in structure and pressurized at the same fluid pressures, whereby the tension in the cables 40 are equalized.

The belt takeup assembly 60 comprises a pair of identical pneumatic or hydraulic piston and cylinder assemblies 76 and a takeup roll 78 which is rotatably mounted on dead axle 80. The ends of axle 80 are retained in and affixed to bracket members 82 with the bracket members 82 being affixed to terminal portions 84 of the piston rods by connecting pins 86. The forces exerted on the axle 80 by the piston and cylinder assemblies 76 are regulated so as to be equal. For example, the assemblies 76 can be interconnected by a conventional force equalization bar or the piston and cylinder assemblies can be supplied with fluid at a common specified pressure whereby the roll 78 is urged against the belt 40 to maintain the desired tension within the belt. The controls for actuating takeup assemblies 58, 60 can operate independently of each other so that the tension imparted to the cables 42 or 42' by takeup assembly 58 need not be dependent on the tension imparted to belt 40 or 40' by takeup assembly 60. As with the other components of the cable trained sealing belt assembly, the force equalization bar or the piston and cylinder assemblies are supported in a conventional manner on support structure, not shown.

Figure 5:
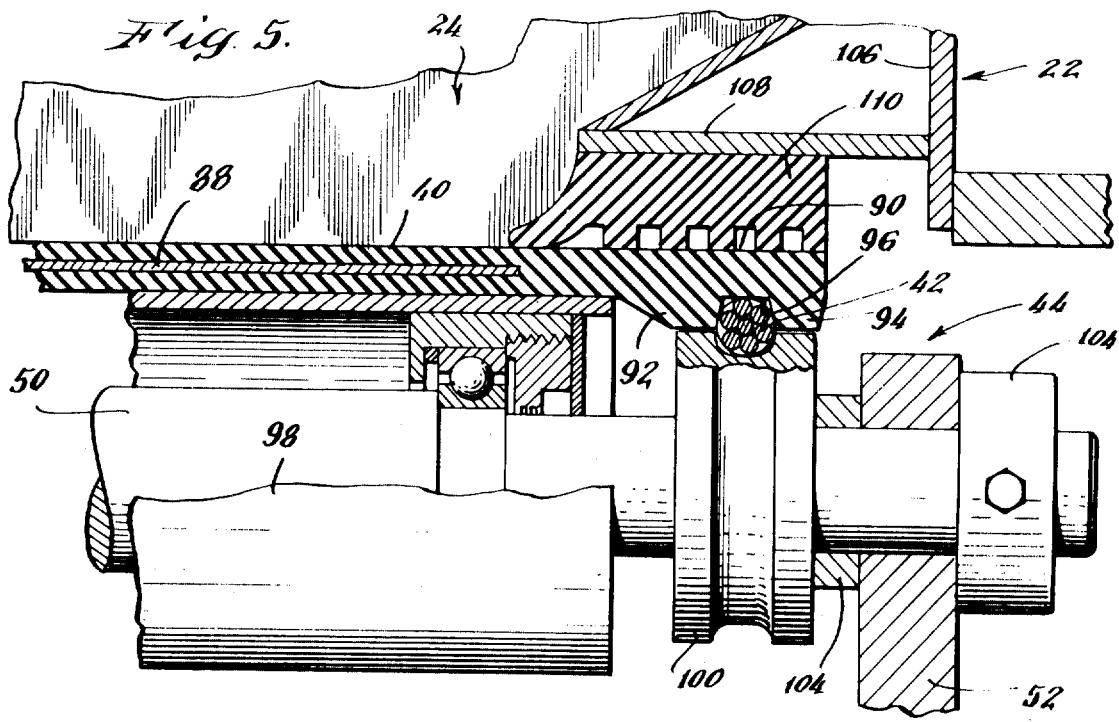
FIG. 5 is an enlarged fragmentary cross-sectional view taken through a typical idler roll and cable sheave, illustrating one form of cable trained seal belt assembly according to the present invention wherein a single cable run is provided adjacent each lateral edge of the seal belt.

As best shown in FIG. 5, in one preferred form of the invention, the belt 40, which is made up of conventional materials well known in the conveyor art (e.g., rubber, synthetic rubber, etc.), is provided with transverse metallic stiffener rods 88 imbedded within the belt at selected intervals to prevent troughing of the belt. The belt 40 is also provided adjacent each lateral edge with a planar sealing surface 90 and a pair of depending, spaced apart, continuous or interrupted ribs 92, 94 which define longitudinally extending grooves 96 for receiving cable 42. The sealing surface 90 and ribs 92, 94 are on opposite sides of the belt with the depth of the groove 96 defined by each set of ribs being substantially equal to the radius of cable 42 so that the cable is carried partly within the groove and partly within the grooves provided in the cable sheaves 100. As shown, the spacing between the ribs is substantially equal to but greater than the diameter of cable 42 to minimize or eliminate lateral movement of the belt relative to the cables. The sealing surface 90 can be other than planar and the depth, width, and configuration of groove 96 can be altered as required with the groove being recessed into the belt rather than defined by ribs.

The belt idlers 98 and the cable sheaves 100 are both mounted on dead axles 50 in a conventional manner with bearing assemblies having their inner and outer races affixed to the axles 50 and the idlers 98 or sheaves 100, respectively, permitting relative rotation of the idlers and sheaves about axle 50. As can be seen in FIG. 5, the bearing assemblies for idler 98 and sheave 100 are retained against lateral movement by the shoulders of axle 50 and collars 104 or equivalent retaining means.

The inner annular surface of elevator wheel 22 along the lateral sidewalls 106 of the storage cells is provided with inwardly extending annular flanges 108 having rubber sealing strips 110 or other equivalent sealing means adhesively or otherwise affixed thereto. The sealing strips 110 extend around the entire inner annular surface of the wheel and engage the lateral sealing surfaces 90 of the sealing belt 40 to prevent the seepage of material from the storage cells during the elevation of the material to the output conveyor 38. As can be readily seen in FIGS. 2 and 5, the cables 42 which ride in the sheaves 100 and extend into grooves 96 of belt 40 maintain the belt in proper alignment with the sealing strips 110 of the rotary elevator wheel with the belt and sealing strips being compressed between flanges 108 of the elevator wheel 22 and cables 42.

FIG. 6 illustrates a modified form of the invention wherein belt 40' is provided with a longitudinally extending rib 114 adjacent but spaced inwardly from each edge of the belt with the rib depending from the belt an extent substantially equal to the radius of cable 42'. The remaining structure of the belt as well as the sealing strip on the rotary elevator and the idler roll is the same as the embodiment set forth in FIG. 5. However, other than the mode for affixing the sheaves to the axle 50', cable sheaves 116 differ from sheaves 100 in that a pair of grooves 118 are provided in each sheave which are spaced apart by a midportion 120 having a width equal to or substantially equal to but somewhat less than the width of rib 114 of the seal belt. Each sheave is provided with a pair of annular flanges 122 that extend radially past the peripheral surface of midportion 120 an extent substantially equal to the depth of rib 114. In addition, grooves 118 in the sheave are of such a depth that cables 42' also extend radially beyond midportion 120 whereby cables 42' are urged against the side faces of rib 114 by annular flanges 122 to maintain the rib between the cables and thereby train the belt.

When utilizing the embodiment illustrated in FIG. 6, a cable crossover, as illustrated in FIG. 7, is provided between sheave and pulley assemblies 124, 126 so that one continuous training cable 42' can be utilized on each side of the belt for both cable runs of the side. In addition, the cable takeup assembly 58' is provided with sheaves on each side that receive both runs of the respective training cable 42' for that side.

OPERATION

Conveyor belt 26, which is wrapped substantially halfway about the outer periphery of elevator wheel 22, is driven by head pulley 28 in the direction shown by arrow 30, thereby imparting a clockwise rotation to the elevator wheel 22 as it deposits material into the storage cells 24 of the wheel. During the elevation of the material within the storage cells, the inner ends of the storage cells 24 are closed and sealed by the cable trained seal belt assembly 20 or 20' until the cells reach a location where the material within the cells can be discharged onto conveyor belt 38.

The seal belt 40 or 40' and training cables 42 or 42' of the seal belt assemblies 20 or 20' are urged radially outward by the idler roll and cable sheave assemblies with the belt 40 or 40' being held against the inner annular surface of the elevator wheel to close off the inner ends of the storage cells. The cables 42 or 42', which are guided by the sheaves 100 or 116, train the seal belt so that it is maintained in proper alignment with the sealing strips 110 of the rotary wheel 22 both at the sheave assemblies and intermediate successive sheave assemblies. In addition, the training cables 42 or 42', which are subjected to much greater tension than the seal belt, urge the belt 40 or 40' against the inner annular surface of the wheel with a force sufficient to effect a good seal between the seal belt and sealing strips 110 and to cause the elevator wheel 22 to drive the cable trained seal belt assembly at the same or substantially the same linear speed as that of the inner annular surface of the wheel.

While not shown, the seal belt assembly could be driven by means other than the frictional drive of the wheel 22, as, for example, by a powered head pulley. Furthermore, it is contemplated that modifications and equivalents can be resorted to which fall in the scope of the invention as disclosed and claimed.

What is claimed is:
1. An improved elevating wheel assembly comprising:
a rotatably mounted elevating wheel having a peripheral portion defined by radially extending, annular sidewalls; an outer annular surface and an inner annular surface; drive means for rotating said elevating wheel; a plurality of storage cells located in said peripheral portion of said elevating wheel; said storage cells being separated by intermediate, radially extending walls; said storage cells extending between said outer annular surface and said inner annular surface; each of said storage cells having an opening on said inner annular surface of said elevating wheel; and compressible annular sealing strips extending entirely around and secured to said inner annular surface of said elevating wheel; said compressible annular sealing strips being located intermediate said storage cell openings and said sidewalls of said elevating wheel;

loading means for transferring material into said storage cells;

unloading means for receiving material from said storage cells;

an endless seal belt for effecting a seal with said compressible annular sealing strips to prevent material deposited within said storage cells by said loading means from escaping from said storage cells prior to being discharged into said unloading means; said belt means having longitudinally extending cable retaining groove means adjacent side edges thereof; and said belt means having longitudinally extending sealing surfaces adjacent said side edges thereof;

a plurality of cable guide and support means; said cable guide and support means comprising sheave means which cooperate with said cable-retaining groove means to form complementary cable-engaging surfaces for retaining cable means therebetween;

independent cable means being carried in said sheaves and engaging said cable-retaining groove means;

spring mounting means for urging said cable guide and support means toward said inner annular surface of said elevating wheel to effect through said cable means a seal between said sealing strips of said elevating wheel and said sealing surfaces of said belt means, to effect frictional contact between said sealing strips and said belt means whereby said belt means is driven by said elevating wheel, and to maintain said belt means and said elevating wheel in proper alignment.

2. In the improved elevating wheel assembly of claim 1, cable takeup means for adjusting the tension in said cable means.

3. In the improved elevating wheel assembly of claim 2, belt takeup means for adjusting the tension in said endless belt means, said belt takeup means and said cable takeup means being independent.